United States Patent
Pleasant

(10) Patent No.: US 9,609,973 B1
(45) Date of Patent: Apr. 4, 2017

(54) AUTOMATED POSTAL DELIVERY NOTIFICATION BASED ON GEOLOCATION

(71) Applicant: Anthem Andrew Pleasant, Peoria, AZ (US)

(72) Inventor: Anthem Andrew Pleasant, Peoria, AZ (US)

(*) Notice: Subject to any disclaimer, the term of this patent is extended or adjusted under 35 U.S.C. 154(b) by 0 days.

(21) Appl. No.: 14/971,881

(22) Filed: Dec. 16, 2015

Related U.S. Application Data

(60) Provisional application No. 62/166,008, filed on May 24, 2015.

(51) Int. Cl.
| | | |
|---|---|---|
| *G08B 13/14* | (2006.01) | |
| *A47G 29/122* | (2006.01) | |
| *G06F 17/30* | (2006.01) | |
| *H04L 12/58* | (2006.01) | |

(52) U.S. Cl.
CPC ... *A47G 29/1225* (2013.01); *G06F 17/30241* (2013.01); *H04L 51/18* (2013.01); *H04L 51/24* (2013.01)

(58) Field of Classification Search
CPC .......... A47G 29/1225; G06F 17/30241; H04L 51/18; H04L 51/24
See application file for complete search history.

(56) References Cited

U.S. PATENT DOCUMENTS

| | | |
|---|---|---|
| 3,611,333 A | 10/1971 | Conigliaro |
| 5,440,294 A | 8/1995 | Mercier |
| 6,114,959 A | 9/2000 | Bennett |
| 6,275,154 B1 | 8/2001 | Bennett |
| 6,327,373 B1* | 12/2001 | Yura ............... G06K 9/723 382/101 |
| 7,104,451 B1* | 9/2006 | McCartney ............ G06K 19/14 235/462.01 |
| 7,786,862 B1 | 8/2010 | Campbell |
| 7,843,340 B2 | 11/2010 | Davis |
| 9,142,035 B1* | 9/2015 | Rotman ............... G06T 7/602 |
| 2001/0012378 A1* | 8/2001 | Kanevsky ............ G06Q 10/107 382/101 |
| 2003/0065625 A1 | 4/2003 | Rosenbaum et al. |
| 2004/0093312 A1* | 5/2004 | Cordery ............ G07B 17/00024 705/401 |

(Continued)

OTHER PUBLICATIONS

Geo-Fence Technology in Delivery Operations; DR-MA-14-006; Aug. 14, 2014; pp. 1-14; https://www.uspsoig.gov/sites/default/files/document-library-files/2015/dr-ma-14-006.pdf.

(Continued)

*Primary Examiner* — Erin File
(74) *Attorney, Agent, or Firm* — John Chandler

(57) ABSTRACT

Disclosed herein is a system for providing electronic notifications of physical delivery of mail. Realtime geolocation services are leveraged to trigger one or more automated notifications. The notifications are delivered via a modern delivery means such as email, SMS text or pre-recorded voice message. No extra equipment is needed to implement the system from the perspective of postal workers since many postal workers already carry a GPS-enabled device. Instead of people passively waiting around for an imprecise time of delivery, people can go about their lives and can respond to actual delivery of paper-based mail via a notification and notification type of their choosing.

8 Claims, 8 Drawing Sheets

(56) References Cited

U.S. PATENT DOCUMENTS

| | | | |
|---|---|---|---|
| 2004/0122690 A1* | 6/2004 | Willoughby | G06Q 10/08 705/337 |
| 2004/0128254 A1* | 7/2004 | Pintsov | G07B 17/00435 705/62 |
| 2004/0128265 A1* | 7/2004 | Holtz | G06Q 10/08 705/406 |
| 2004/0236635 A1 | 11/2004 | Publicover | |
| 2007/0129957 A1* | 6/2007 | Elliott | G07B 17/00435 705/408 |
| 2007/0233507 A1 | 10/2007 | Publicover | |
| 2007/0288760 A1* | 12/2007 | Euchner | G07B 17/00508 713/189 |
| 2008/0040243 A1 | 2/2008 | Chang | |
| 2008/0255758 A1* | 10/2008 | Graham | G08G 1/20 701/469 |
| 2008/0290151 A1* | 11/2008 | Usmani | A47G 29/1212 232/35 |
| 2009/0005901 A1 | 1/2009 | Stemmle | |
| 2013/0103606 A1 | 4/2013 | Holliday | |
| 2013/0147626 A1 | 6/2013 | Hammoud | |
| 2014/0247123 A1 | 9/2014 | Batterson | |
| 2014/0316841 A1* | 10/2014 | Kilby | G06Q 10/06316 705/7.26 |
| 2014/0374478 A1* | 12/2014 | Dearing | G06Q 10/0833 235/385 |
| 2015/0120598 A1* | 4/2015 | Fadell | G06Q 10/083 705/333 |
| 2015/0262122 A1 | 9/2015 | Jenkins | |

OTHER PUBLICATIONS

Internet of Postal Things; RARC-WP-15-013; Aug. 3, 2015; pp. 1-35; available at https://www.uspsoig.gov/sites/default/files/document-library-files/2015/rarc-wp-15-013_0.pdf.

Mr. Postman product; unsuccessful Kickstarter campaign; avaiable at: https://www.kickstarter.com/projects/1033096239/mr-postman-the-smart-secure-wi-fi-enabled-mailbox.

* cited by examiner

AUTOMATED POSTAL DELIVERY NOTIFICATION BASED ON GEOLOCATION

This application claims priority to, and the benefit of, U.S. provisional patent application filed on 24 May 2015 and having Ser. No. 62/166,008.

BACKGROUND

Field

The present invention relates generally to auto-generated notifications triggered by delivery of postal mail, and more specifically to triggering delivery of an electronic notification based on geolocation detection and geolocation data associated with mail delivery locations.

Related Art

In addition to paper-based mail, society has become accustomed to instant and realtime social interactions. Most individuals expect expect frequent updates from such sources as Facebook likes, Twitter tweets, email message delivery notifications, and text message alerts. These daily communications provide members of society with welcomed instant social interaction.

Paper-based mail—or snail mail—has not kept current with modern society. Over the years, inventors have made various types of systems and devices for notifying residents of mail delivery. Some of the devices have focused on mechanical or electrical components that detect operation of parts of a postal delivery box. For example, in one of these contraptions, when a postal mailbox lid would be opened, a sensor triggered an actuator to ring a bell. Such device relied on extra hardware installed at each mail receiving location. Other examples were not much more elegant than that. Such mail delivery notification devices required extra expense and maintenance for continued operation. Further, there was no standardization of mechanism. Yet further, if a resident was not present when the notification was triggered, then the notification was not very useful.

In contrast to times past, email and other communication means provide information in seconds whereas traditional snail mail delivery takes days. The present disclosure is directed toward overcoming many of the shortcomings of previously available techniques for providing a notification of physical mail delivery.

SUMMARY

Embodiments and techniques described herein relate to providing a notification of physical mail delivery. According to one implementation, realtime geolocation services are leveraged to trigger one or more automated notifications. The notifications are delivered via a modern delivery means. No extra equipment is needed other than GPS-enabled devices that are already being carried by U.S. postal workers. Instead of people passively waiting around for an imprecise time of delivery, people can go about their lives and instead can respond to actual delivery of paper-based mail via a notification and notification type of their choosing. The notification system presented herein could serve a larger function than a daily acknowledgement of snail mail delivery. The notification system can be expanded to provide additional information and could end up providing an additional social service and form part of an expanded social system. For example, the daily acknowledgement could provide the elderly notification of bad weather conditions at their specific location.

This summary is provided to introduce a selection of concepts in a simplified form that are further described below in the detailed description. This summary is not intended to identify key or essential features of the claimed subject matter, and thus is not intended to be used to limit the scope of the claimed subject matter.

BRIEF DESCRIPTION OF THE DRAWINGS

While the appended claims set forth the features of the disclosure with particularity, the disclosure, together with its objects and advantages, is more readily appreciated from the following detailed description, taken in conjunction with the accompanying drawings. Throughout, like numerals generally refer to like parts. Unless specifically indicated, the components and drawings are not shown to scale.

DETAILED DESCRIPTION

Overview. The present disclosure solves many of the shortcomings of known systems and methods for providing notification of mail delivery at residences and the like. The present disclosure details a system for snail mail receipts in the form of a daily electronic communication or pre-recorded phone call after a United States Postal Service (USPS) carrier delivers mail. In this system, there is no need for a tracking number or barcode and applies to any delivery including time-sensitive mail and junk mail. While reference to the USPS is made, it is understood that the system and methodologies described herein can apply to any delivery service.

Many USPS delivery workers already carry a global positioning system (GPS) enabled device. Realtime data from such GPS postal devices can be combined with geo-location data and geo-fencing technology to automatically deliver a message to one or more electronic or telephone accounts associated with one or more occupants of a residence when the device approaches or reaches a pre-configured location. The following disclosure provides further details of a system for providing notifications of mail delivery.

Figure 1:
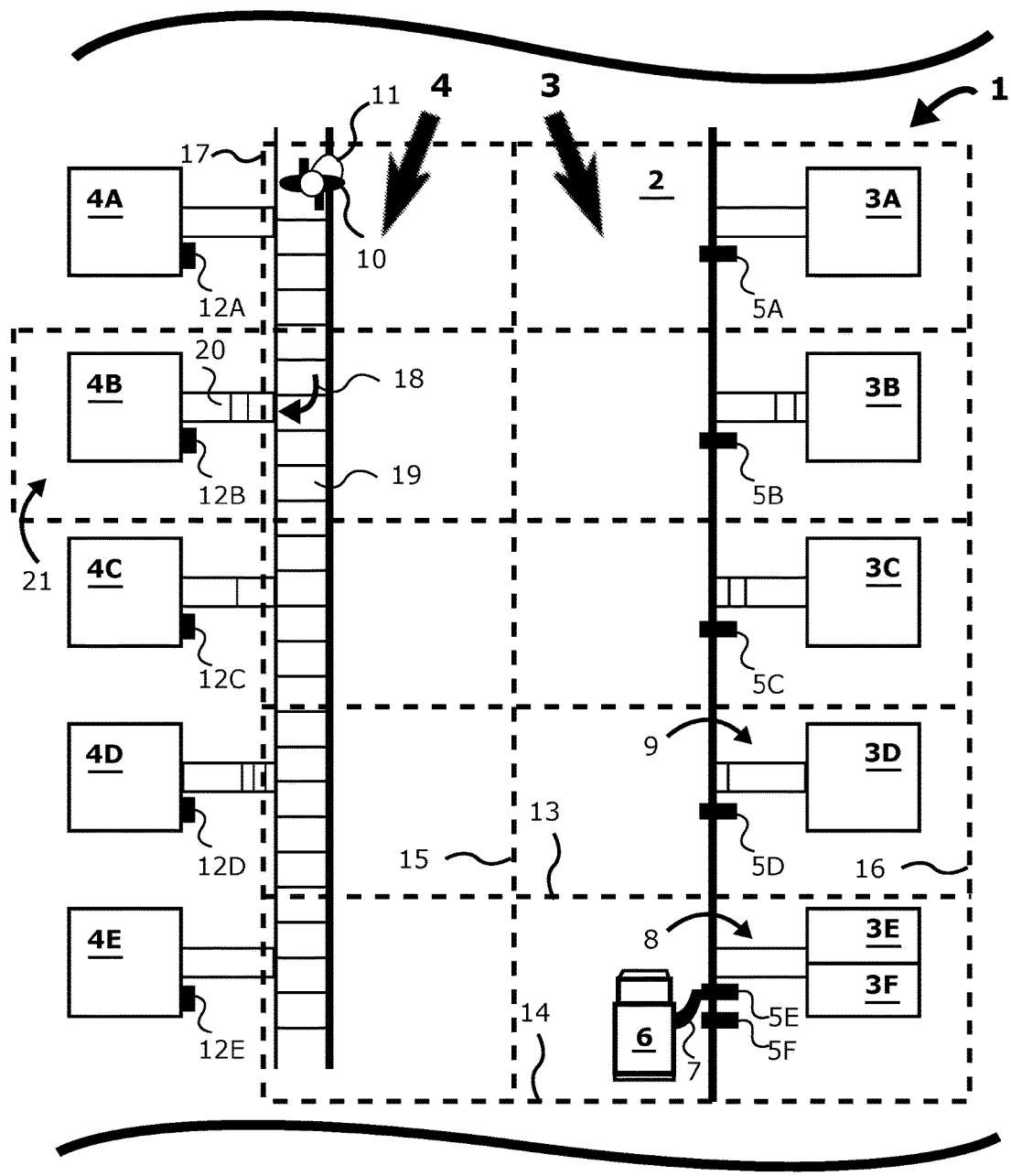
FIG. 1 illustrates a schematic overhead view of a small portion of a neighborhood of mostly single family houses with mail delivery to either a street-accessible mailbox or a house- or porch-mounted mailbox.

FIG. 1 illustrates a schematic overhead view of a small portion of a neighborhood of mostly single family houses with mail delivery to either a street-accessible mailbox or a house- or porch-mounted mailbox. With reference to FIG. 1, an overhead view 1 includes a street 2 on which are built houses. On the right side 3 of the street 2, a sequence of houses 3A-3F receive mail at a respective street-accessible mailbox 5A-5F. On the left side 4 of the street 2, a sequence of houses 4A-4E receive mail at respective house- or porch-mounted mailboxes 12A-12E. Thus, FIG. 1 illustrates two distinct types of mail delivery, both of which can implement the system described herein.

On the right side 3 of FIG. 1, a USPS delivery jeep 6 is in front of house 3E-3F—a duplex that has two dwellings under one roof. The residents of the duplex 3E-3F use respective mailboxes 5E, 5F for accepting mail delivery. The USPS worker 7 inside the USPS jeep 6 has stopped inside a first geo-fence region 8. The USPS worker 7 wears on her person a GPS-enabled device (not shown) that can determine within at least a few feet (few meters) where the USPS worker 7 is located at any given time assuming sufficient satellite reception is viable on this street 2. The GPS-enabled device broadcasts its location to a component of the notification system that in turn makes the location of the specific GPS-enabled device known to other parts of the system including the notification portion(s) of the system.

The first geo-fence region 8 is associated geographically with the duplex 3E-3F and mail delivery to mailboxes 5E, 5F. Data associated with the first geo-fence region 8 is at least associated with the mailboxes 5E, 5F and, in turn the mailboxes 5E, 5F associated with electronic user accounts. Alternatively, the data associated with the first geo-fence region 8 may be associated directly with one or more electronic user accounts depending on configuration details. Users associated with the user accounts would then be responsible for updating the connection between a particular geo-fence region and the user accounts, or updating the association between the particular mailbox and the user accounts.

The rectangular first geo-fence region 8 is defined by two horizontal or latitude GPS lines 13, 14 and by two vertical or longitudinal GPS lines 15, 16. The GPS lines 13-16 and data associated therewith have previously been determined and stored in a geo-fence computer system (not shown). That is, a geo-location based map is needed—a map to associate GPS coordinates and boundaries with dwellings, and more specifically to mailboxes of all kinds such as mailboxes 5A-5F. The left longitudinal GPS line 15 has been arbitrarily located approximately in the middle of and parallel to the street 2. Thus, the GPS geo-fence system can determine and distinguish mail delivery on the right side 3 of the street 2 from delivery on the left side 4 of the street 2.

Upon the GPS-enabled device entering, dwelling in, or exiting the first geo-fence region 8, an electronic notification is sent to the residents that receive mail in mailboxes 5E and 5F. In this illustration, the geo-fence computer system cannot distinguish mail delivery between 5E and 5F, but can determine that the USPS worker 7 has paused long enough in the first geo-fence region 8 for a likely delivery to mailbox 5E or mailbox 5F or delivery to both mailboxes 5E and 5F.

Herein, reference is made to an electronic notification. As used herein, an electronic notification may take one or more of various forms. A delivery notification can be an automated email message, pre-recorded telephone message, a SMS-based text message, a direct message to a social media Internet- or mobile-device-based account, and so forth. Each mailbox, such as mailboxes 5E-5F, can be associated with multiple electronic accounts. That is, multiple people may receive mail at any one physical mailbox. Accordingly a postal delivery notification may need to be delivered multiple electronic services and multiple electronic accounts. For example, a delivery notification for mailbox 5F may need to be delivered to (1) three email addresses, (2) two electronic direct messaging accounts provided by two individually operated electronic service providers, and (3) an SMS-text-based telephone number.

Each electronic notification is generated and delivered transparently and behind the scenes as the USPS worker 7 goes about her normal routines. That is, from the perspective of the USPS worker 7, no behavioral or delivery change is needed for the system to operate. However, each resident receiving mail in the overhead view 1 would be responsible for authenticating with and configuring delivery of a notification to one or more accounts. That is, each resident would need to contact the USPS and associate at least one electronic account for receiving an electronic delivery notification.

According to one illustrative implementation, the USPS would operate an Internet-based computer system that would allow a user to opt-in to the notification system and to provide the credentials for receiving a notification at one or more electronic accounts. According to another implementation, each user of the system would need to visit a USPS location and authenticate in person by providing proof of residency associated with a dwelling and geo-fence location. Each resident is required to signed up via a website, smartphone app, postcard, a phone call or some other means.

Returning again to FIG. 1, once the USPS delivery jeep 6 advances into a second geo-fence region 9, the notification process can be repeated (behind the scenes) for mailbox 5D and for the residents of dwelling 3D. That is, as long as the geo-fence system determines that the USPS jeep 6 and USPS worker 7 pauses or stops within the second geo-fence region 9, the system can notify the occupants of house 3D that mail was likely delivered to mailbox 5D. According to one illustrative implementation, an audible or visible alert can be provided to a component of the USPS jeep 6 when the geo-fence system receives notification that the GPS-enabled device carried by the USPS worker 7 has entered into the second geo-fence region 9. In this scenario, the system detects GPS-centric data consistent with a probable delivery or a "GPS-authenticated delivery" of mail at house 3D. That way, the postal worker 7 is notified that the notification system is working for house 3D. Such notification to the USPS worker 7 is optional but can give certainty to the USPS worker 7 that the notification for mailbox 5D and house 3D corresponds to the actual second geo-fence region 9. Such worker notification may take the form of a text-based or symbol-based notification system that provides more information than a simple audible or visual cue.

Turning to the left side 4 of the street 2, mail delivery is performed by a walking USPS worker 10 carrying mail in a pouch 11. Mail is delivered to each house 4A-4E at respective house- or porch-mounted mailboxes 12A-12E. The USPS worker 10 is proceeding from the top of the figure to the bottom of the figure, from house 4A along the sidewalk 19 to successive houses 4B-4E. The USPS worker 10 has determined that no mail is available for house 4A, and mail does not need to be delivered to mailbox 12A. In this scenario, the USPS worker 10 needs to deliver mail to mailbox 12B. The USPS worker 10 is going to follow arrow 18 and walk up the walkway 20 for house 4B. In the process of doing so, the USPS worker 10 crosses a third geo-fence vertical or longitudinal boundary 17. The USPS worker 10 would then cross into geo-region 21 associated with house 4B and mailbox 12B. Such event would trigger an electronic delivery notification to one or more electronic accounts associated with dwelling 4B and/or mailbox 12B. Thus, the system could distinguish an actual delivery to house 4B and a non-delivery to house 4A. No false positive notifications would occur based on geographic determination. For the right side 3 of the street 2, a time-based detection scheme is used to prevent false positive notifications since no vertical or longitudinal geo-fence boundaries were involved with travel of the USPS jeep 6 in making its deliveries. In the system, a combination of temporal and geographical schemes can be combined to ensure that no false positive notifications are sent. After visiting mailbox 12B, the USPS worker 10 would then continue on his way by making deliveries to subsequent houses 4C-4E as warranted by the contents of the mail bag 11.

Variations. While a GPS-enabled device is mentioned, the GPS-enabled device may also include other circuitry such as cellular telephone or other location-determining technology. Data from such additional circuitry may be used to provide a more accurate determination of a dwell time at any given mailbox or location of the postal worker 7 with respect to a geo-location such as a first geo-fence region 8 and geo-fence region 9. While a single mailbox such as mailboxes 5E, 5F are mentioned in association with residents of dwellings 3E, 3F, other variations for notification may be provided. For example, the residential dwellings 3A-3F and 4A-4E may be commercial or a mix of residential and commercial locations.

As another example, if a resident of dwelling 3A prefers, the 3A resident may configure his USPS notification account to send a near-realtime notification when the USPS jeep 6 and postal worker 7 are proximate to dwelling 3E, thereby providing some advanced notice that the postal worker 7, in about 120 seconds, will be in front of his house 3A. That way, the resident of house 3A has the capability to leave his house 3A and reach the mailbox 5A so as to have a person-to-person interaction according to the needs of the resident of house 3A. Such realtime notice provides additional functionality that is not previously possible. Further, such notification is only dependent on the resident of house 3A and has no impact on USPS worker 7 as all of the notification is done transparently behind the scenes of normal mail delivery.

Figure 2:
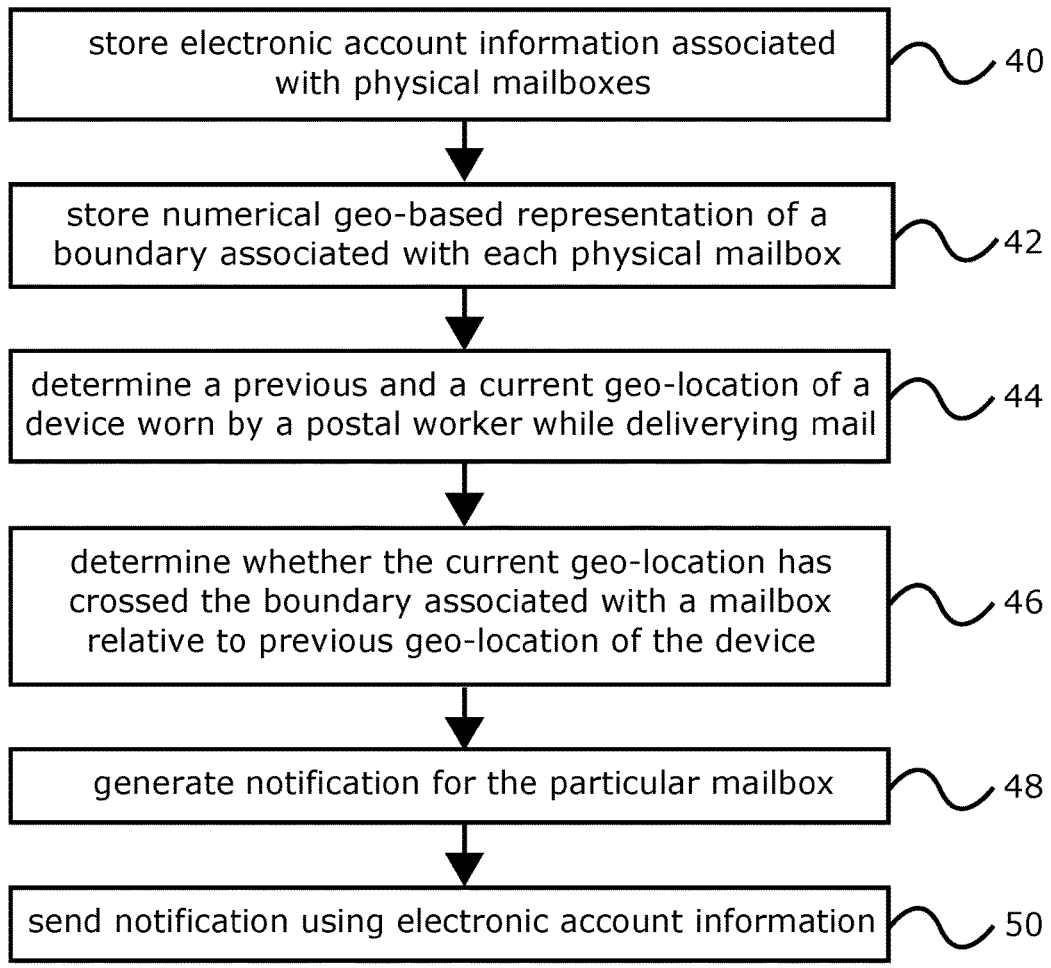
FIG. 2 illustrates a flowchart of steps outlining a process as described more fully herein for providing notification of mail delivery.

FIG. 2 illustrates a flowchart of steps outlining a process for providing notification of mail delivery according to one implementation of the technology disclosed herein. With reference to FIG. 2, a first step 40 includes storing one or more electronic account addresses associated with each physical mailbox. In a preferred implementation, the electronic account address or addresses correspond to accounts of persons or businesses who receive physical mail at a respective physical mailbox. Another step 42 includes storing a numerical geo-based representation of a boundary associated with the physical mailbox. In another step 44, a previous geo-location and a current geo-location of a device worn by a postal worker are determined and held in memory or recorded. Such information is preferably provided in real time and processed in real time for use in other processing including further steps in the process. Another step 46 includes determining whether the current geo-location of the postal worker device has crossed the boundary associated with the physical mailbox in reference to the previous geo-location of the device. This step 46 is done for every device associated with the system. That is, the system is capable of processing thousands of devices in use at any one time.

According to another step 48, one or more electronic notifications are generated for each mailbox. According to this step 48, the notification may contain information unique to each particular mailbox, date, time, boundary crossed and so forth. Alternatively, the notification generation may be done once for each update of information associated with a mail recipient or physical mailbox user, and the same notification is then re-used for each delivery to that mailbox until the information associated with that physical mailbox is changed. For example, a SMS text message can be generated which states, "U.S. Mail has been delivered to 123. Monroe Street." This message could be delivered each time physical mail is delivered to the respective physical mailbox.

According to a final step 50, one or more electronic notifications are sent to the electronic account address or addresses associated with the physical mailbox in response to notification triggering. One triggering or electronic notification delivery is done for each mailbox per day or per delivery so as to avoid repeat triggering for a mail carrier performing small geographic motions proximate to a geofence border. Thus, according to this method, notification is sent in realtime that communicates that paper-based mail and/or packages are delivered to a physical mailbox or mail receptacle.

There are many benefits for sending a notification. One of these benefits is increased security of mail. For the elderly who receive a once-per-month social security, pension disbursement or other financial payment, delivery notification can ensure that someone responsible is available to arrive at the mailbox and secure important paper mail deliveries.

Figure 3:
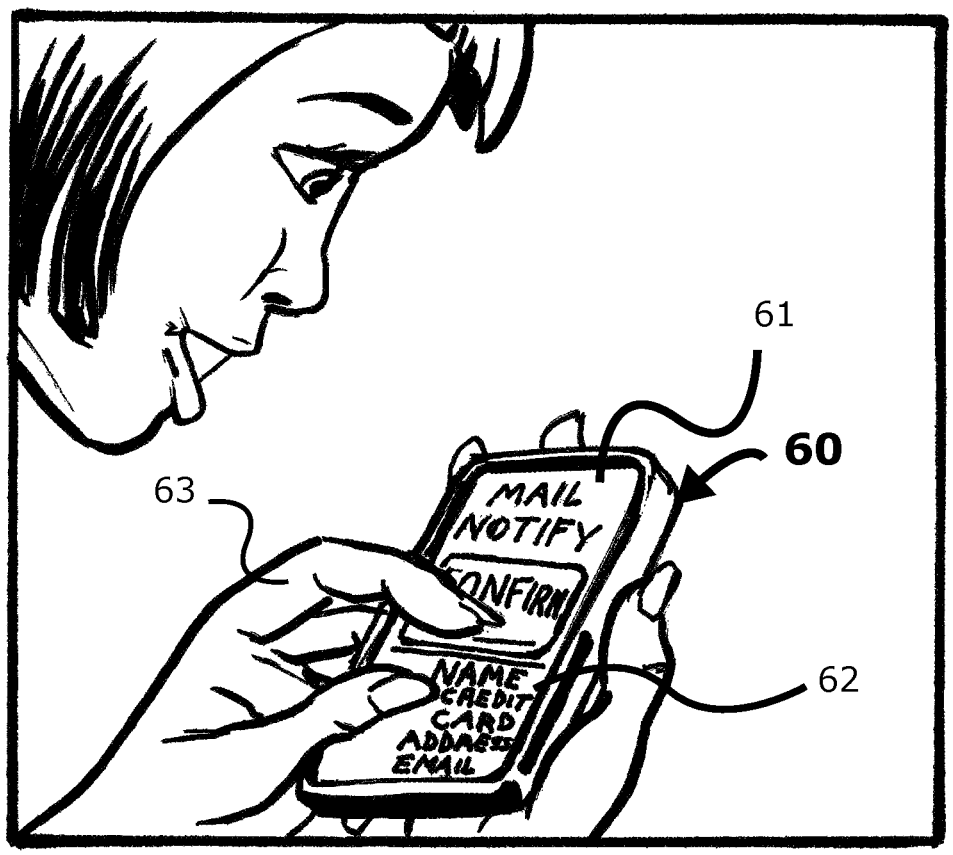
FIG. 3 illustrates a perspective view of a user configuring a mobile device for receiving a postal or mail delivery notification.

FIG. 3 illustrates a perspective view of a user configuring a mobile device for receiving a postal or mail delivery notification. With reference to FIG. 3, a user is able to configure or sign up for delivery notifications via a mobile device 60 through a user interface 61. A user is required to provide information or data for certain fields 62 such as physical address, email address and credit card or other payment information. According to one implementation, a user is required to provide payment information so as to pay a modest fee per delivery, per week, per month, per year, or based on mail volume, or some other scheme to participate in the mail delivery notification system. While a user may use a hand or finger 63 to interact with the user interface 61, the user instead may use her voice to provide information to the system. Further, if selected, a user may provide a custom voice message to be delivered to the mobile device 60 when physical mail is delivered to a respective mail receptacle (not shown).

Figure 4:
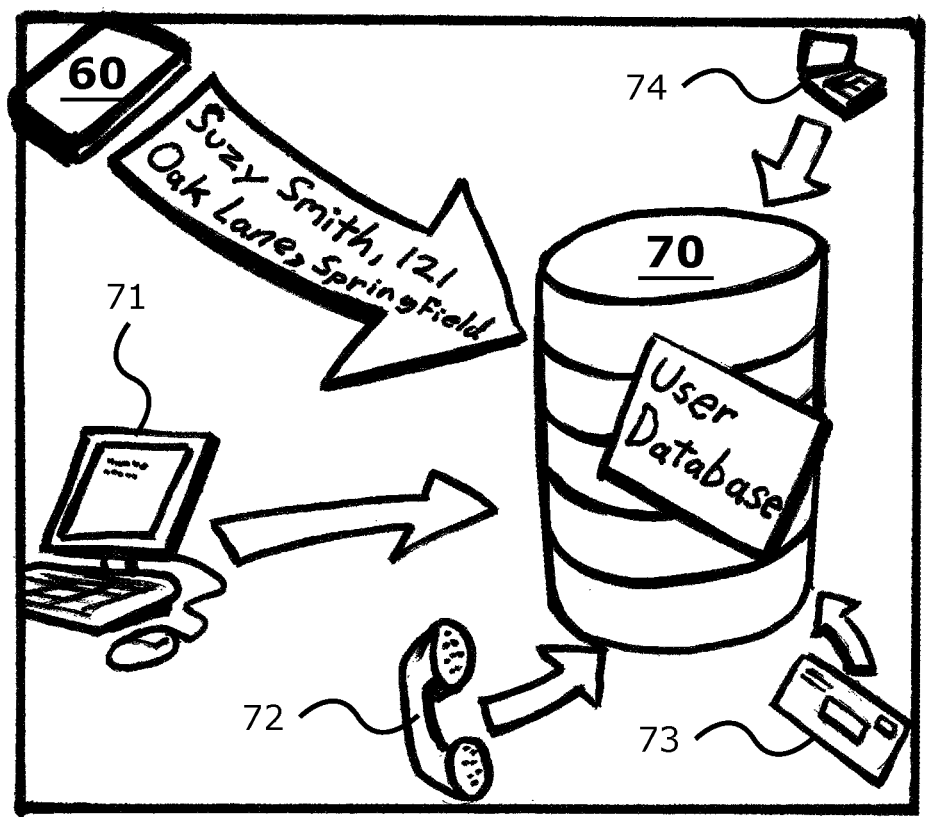
FIG. 4 illustrates sources of data for a system that is configurable to deliver a postal or mail delivery notification.

FIG. 4 illustrates sources of data for a system that is configurable to deliver a postal or mail delivery notification. With reference to FIG. 4, information is provided by a mobile device 60 such as the device 60 first shown in FIG. 3. Information may also come from a personal computer 71 and telephone 72. Mail data may come from images of mail 73 and mobile devices 74 carried or used by postal workers. Information is stored in one or more databases 70. While a single user database 70 is shown, the system may include a variety of databases, computer components, network components and so forth so as to be able to provide physical mail delivery notifications.

Figure 5:
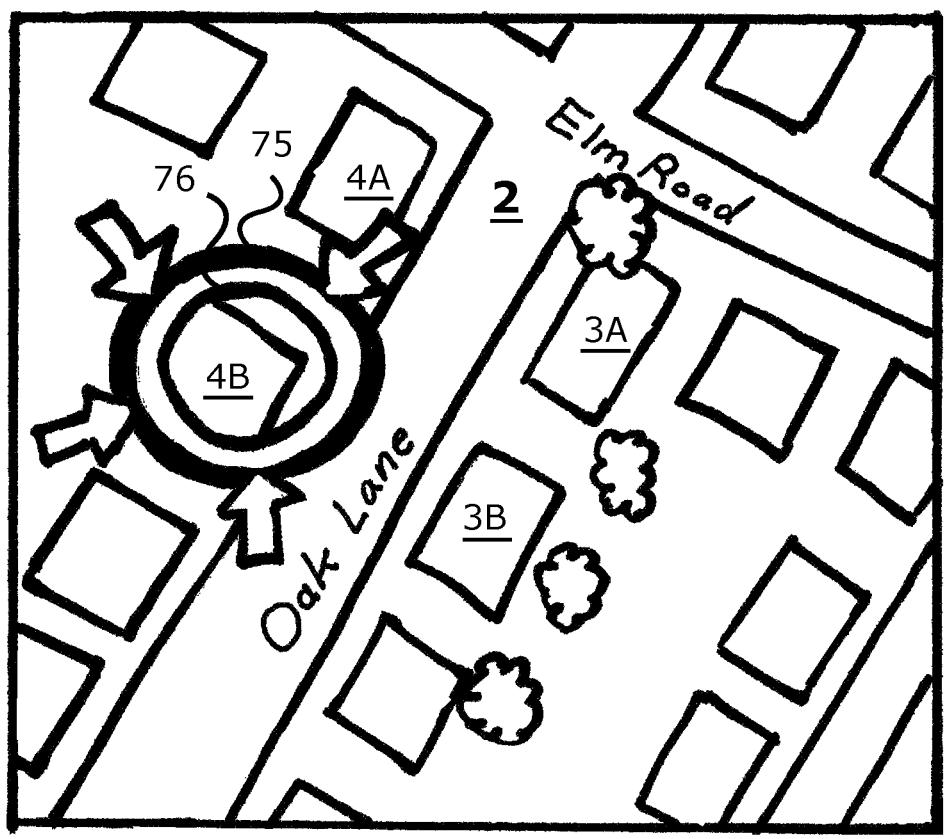
FIG. 5 illustrates a schematic overhead view of a small portion of a neighborhood similar to that of FIG. 1 along with configuration zones.

FIG. 5 illustrates a schematic overhead view of a small portion of a neighborhood similar to that of FIG. 1. With reference to FIG. 5, the system requires a designation of at least one configuration zone 75 that is proximate to any given mail receptacle associated with a residence such as house 4B. The system accommodates a plurality of configuration zones such as a first configuration zone 75 and a second configuration zone 76. A first configuration zone 75 may be configurable by a user or physical mail recipient, and the second configuration zone 76 may be configurable by a postal worker. Alternatively, both the first configuration zone 75 and second configuration zone 76 can be configured by a mail recipient for any given property or mail receptacle.

A first configuration zone 75 may trigger a first type of mail delivery alert such as an alert corresponding to a postal working passing through the neighborhood and somewhat close to a residence 4B. A first delivery alert may correspond to the scenario that the mail worker was present or in the same neighborhood as the residence 4B but did not actually deliver any mail yet. A second and independent alert may be sent based on a geolocation trigger for crossing into or through a second configuration zone 76. As shown in FIG. 5, the second configuration zone 76 is smaller and perhaps more proximate to a mail delivery receptacle near the residence 4B. Accordingly, when a postal worker crosses into or through such second configuration zone 76, a second type of mail delivery alert is dispatched. These zones 75, 76 may be configured by a mail recipient through a user interface on a mobile device, via a personal computer, or some other way.

Figure 6:
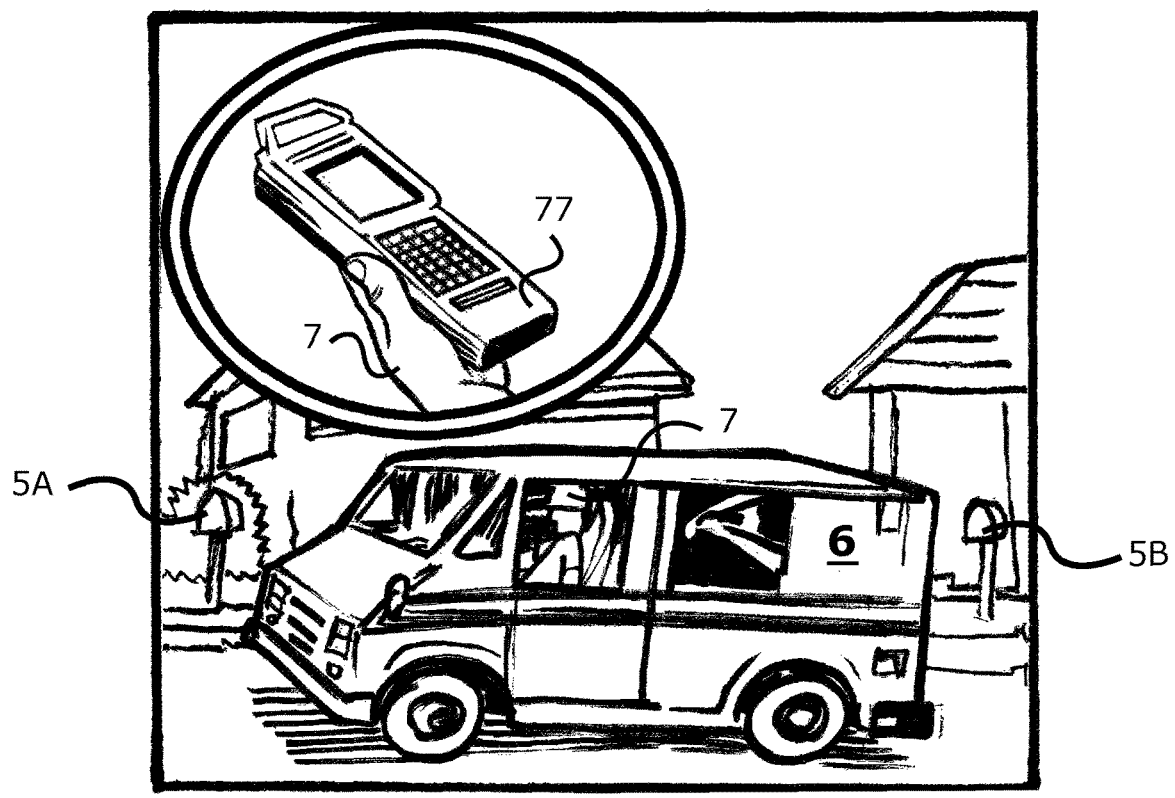
FIG. 6 illustrates a street level perspective view of a portion of the neighborhood illustrated in FIG. 1.

FIG. 6 illustrates a street level perspective view of a portion of the neighborhood first illustrated in FIG. 1. With reference to FIG. 6, a postal worker 7 is operating a mail truck 6 and making mail deliveries to street side mailboxes 5A, 5B. In the inset, the postal worker 7 is shown holding a mobile GPS-enabled device 77. However, this device 77 can merely be carried on the postal worker 7 or in the vehicle 6 and the device 77 can thereby provide GPS information to the system passively. This device 77 includes programming to track packages and postal worker location, provide a current time and so forth. Based on the location of this device 77, the system is informed of the location of the postal worker 7 and the system can intuit when and where mail is being delivered. Without any action needed by the postal worker 7, the device 77 is able to send geolocation information to the system, and an alert can be sent to an electronic account associated with a proximate mailbox 5A. The first mailbox 5A is shown with a zigzag alert line indicating that an alert message has been sent indicating that mail has likely been delivered to the mailbox 5A. The second mailbox 5B was not implicated and an alert message or signal has not be sent for delivery to the second mailbox 5B.

Figure 7:
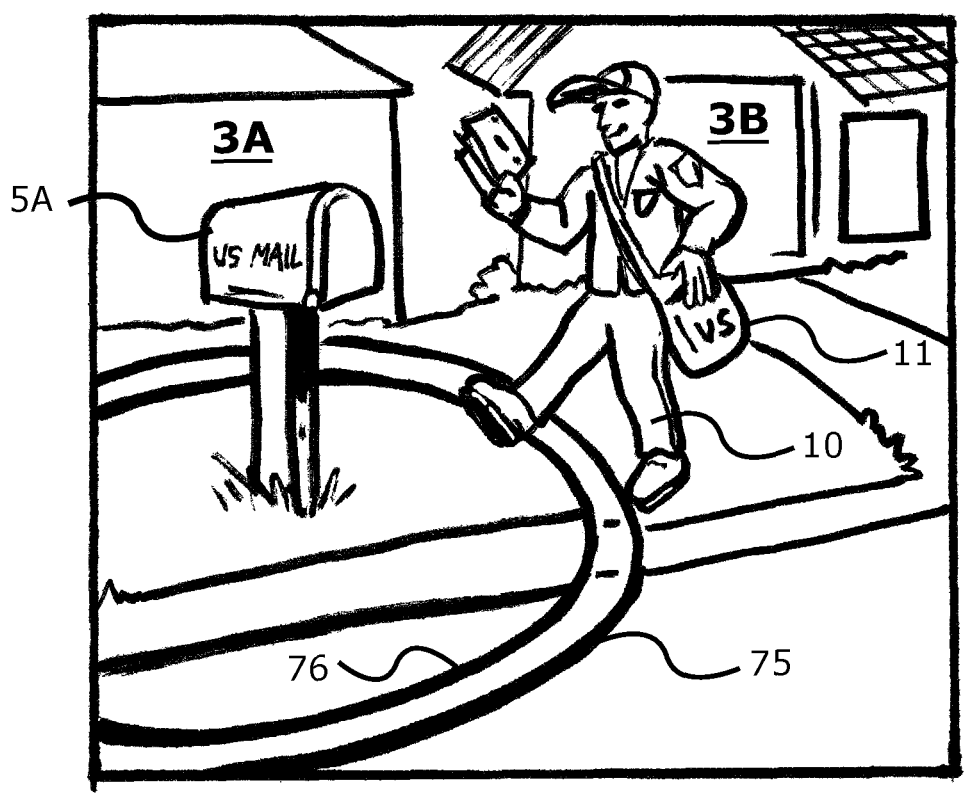
FIG. 7 illustrates another street level perspective view of the same portion of the neighborhood illustrated in FIG. 6 with mail delivered by a postman on foot.

FIG. 7 illustrates another street level perspective view of the same portion of the neighborhood illustrated in FIG. 6 with mail delivered by a mail worker 10 on foot. With reference to FIG. 7, a mail worker 10 carrying a postal bag 11 is approaching a first mailbox 5A and into a first zone 75 and second zone 76. In this figure, the second zone 76 is smaller than the first zone 75. When a GPS-enabled device (not shown) is carried into the zones 75, 76 an alert is generated. A single alert may be generated based on the mail worker 10 passing through both boundaries or zones 75, 76, or two distinct alerts may be sent—one for each of the respective zones 75, 76. Preferably, when the first zone 75 is approximately the same as the second zone 76, only a single delivery alert or message is delivered by the system.

Alternatively, the first zone 75 may correspond to a first user associated with the mailbox 5A, and a second zone 76 may correspond to a second user associated with the mailbox 5A. Thus, separate accounts or devices corresponding to a husband and wife or corresponding to two roommates that live at the first residence 3A may both receive a notification that the postal worker 10 has likely delivered mail at this instant in time.

Figure 8:
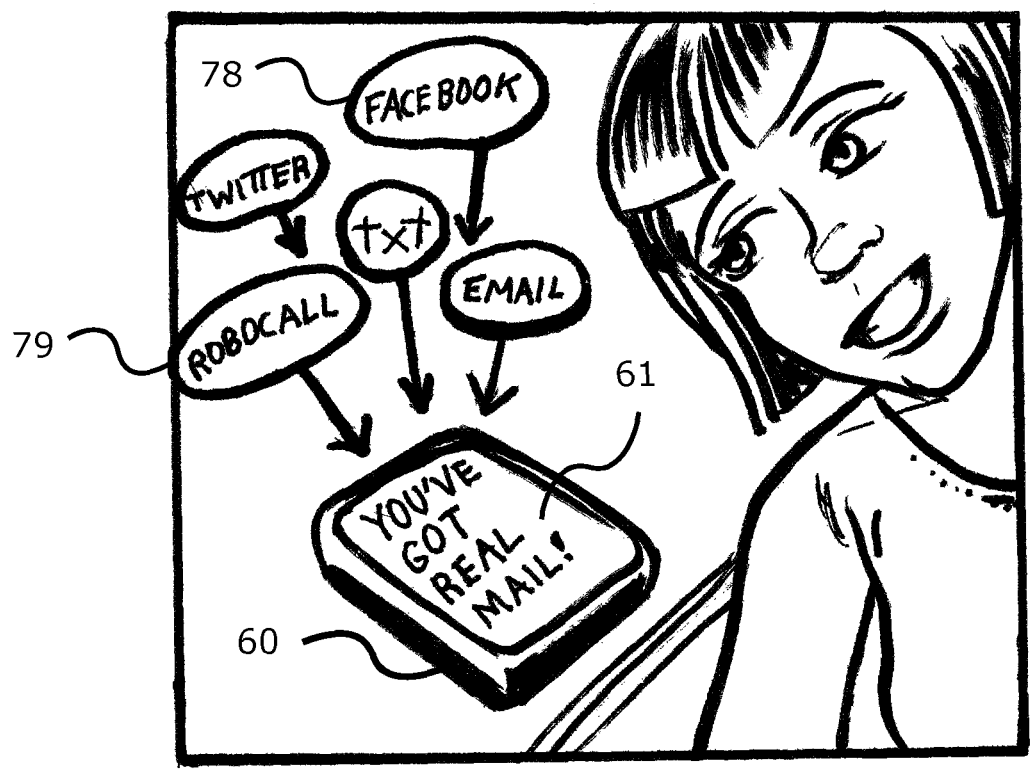
FIG. 8 illustrates a perspective view of a mobile device receiving a mail delivery notification.

FIG. 8 illustrates a perspective view of a mobile device receiving a mail delivery notification. When mail is delivered as shown in FIG. 7, an electronic account accessible via the device 60 receives the notification. With reference to FIG. 8, the user is able to access the notification through a user interface 61. An alert may take one or more various forms. For example, an alert may be a text-based message delivered to a social media account 78. As another example, an alert may be a text-based alert sent to a phone number and corresponding SMS text message account.

As yet another example, a voice- or audio-based message 79 may be delivered. In this case, the alert may take the form of an automated robocall 79 that is delivered to a phone number associated with the mobile device 60. Through a call, the user is alerted in realtime that a postal worker has delivered physical mail. According to one implementation, a first user may be able to configure a personalized message to be delivered to an account associated with a second user. That is, a grandchild could record a personal greeting for a grandmother so that the grandmother receives a pre-recorded message spoken by the grandchild each time mail is delivered to the mailbox 5A and residence 3A.

As yet another example, a pre-recorded message could be added to some system-generated or system-available information and then a composite message could be delivered to the device 60. Specifically, a computer-generated audio representation of a current time could be appended to a user-selected or user-recorded message so that the recipient would receive a phone call indicating the time at which mail was delivered to the residence 3A.

According to another example, a geo-based notification message includes dynamic content from another source, the Informed Delivery service of the U.S. Post Office (USPS). As a matter of routine processing, the USPS already captures an electronic image of nearly every piece of mail that passes through its facility. Black and white images of letter-sized mail pieces are captured. These images are processed with optical character recognition (OCR) technology. The delivery address from the images is matched to a delivery address in the geo-based notification database. Before delivery notification is sent out, a compound notification is generated by including a picture of each item actually delivered at that instant by the postal worker. This type of notification occurs without any further active step needed due to information that is already in the electronic postal computer systems. The image information from each paper mail item is merely matched up with the geo-based notification information. Alternatively, the compound notification includes information derived from OCR processing. Such information may include the name and address of the originator of each piece of mail, the date when the item was processed, and any other information available on the outside of each mail item. Accordingly, each postal recipient is provided with notice in realtime of the pieces of mail delivered.

Conclusion. In the description, for purposes of explanation, numerous specific details are set forth in order to provide an understanding of the disclosure. It will be apparent, however, to one skilled in the art that the system and methods can be practiced without these specific details. In other instances, structures, devices, systems and methods are shown only in block diagram form in order to avoid obscuring the invention.

Reference in this specification to "one embodiment", "an embodiment", or "implementation" means that a particular feature, structure, or characteristic described in connection with the embodiment or implementation is included in at least one embodiment or implementation of the invention.

Appearances of the phrase "in one embodiment" or "in one implementation" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It will be evident that the various modification and changes can be made to these embodiments without departing from the broader spirit of the description. In this technology, advancements are frequent and further advancements are not easily foreseen. The disclosed embodiments may be readily modifiable in arrangement and detail as facilitated by enabling technological advancements without departing from the principles of the present disclosure.

I claim:

1. An electronic notification system for mail delivery, the system comprising:
   a set of geo-location data associated with a physical mailbox, stored in a first database operative on a first computing device, the set of geo-location data including:
      a first mail-delivery boundary associated with the physical mailbox, the first mail-delivery boundary received from a user selection provided by an owner of the physical mailbox; and
      a threshold dwell time associated with the physical mailbox;
   an electronic account credential associated with the physical mailbox, stored in the first database, the electronic account credential including an electronic address of an electronic messaging service;
   a GPS-enabled device for carrying by a postal worker delivering pieces of mail to the physical mailbox, and wherein the GPS-enabled device is configured with instructions to communicate its current location to the electronic notification system;
   a notification component, operating in a memory of the first computing device, in electronic communication with the GPS-enabled device, the notification component configured with instructions to:
      detect a first transition across the first mail-delivery boundary by comparing the current location of the GPS-enabled device with the first mail-delivery boundary;
      determine an actual dwell time of the postal worker device remaining geographically proximate to the first mail-delivery boundary;
      compare the actual dwell time to the threshold dwell time;
      generate an electronic delivery notification; and
      send the electronic delivery notification to the electronic account based on the detected first transition and dwell time comparison.

2. The system of claim 1, wherein the electronic delivery notification includes a pre-stored text-based message that includes a mail delivery address of the physical mailbox, and wherein the notification component is configured to send the electronic delivery notification upon the GPS-enabled device exiting a second mail-delivery boundary associated with the physical mailbox, the notification component further configured to:
   activate an audible alert by the GPS-enabled device upon the GPS-enabled device exiting the second mail-delivery boundary associated with the physical mailbox.

3. The system of claim 1, wherein the system includes a second set of geo-location data for a second physical mailbox, wherein a second mail-delivery boundary is associated in the first database with the second set of geo-location data of the second physical mailbox, and wherein the electronic delivery notification is sent in response to the current location of the GPS-enabled device crossing the second mail-delivery boundary associated with the second physical mailbox.

4. The system of claim 1, and wherein the system includes a pre-recorded audio-based message associated with the physical mailbox wherein generating an electronic delivery notification includes appending a computer-generated audio representation of a current time to the pre-recorded audio-based message and wherein sending the electronic delivery notification includes sending the appended audio-based message to the electronic account.

5. The system of claim 1, and wherein the system further comprises:
   an image capturing component that is configured with instructions to:
   capture electronic images of pieces of mail addressed to the physical mailbox;
   perform optical character recognition (OCR) on the captured electronic images, via an electronic device having a camera, a processor and a memory configured within computer-executable instructions to perform the OCR; and
   store text-based information based on the optical character recognition;
      and wherein the notification component is further configured with instructions to match delivery information derived from the OCR with a delivery address of the physical mailbox;
      and wherein generating the electronic delivery notification includes adding, to the electronic delivery notification, information derived from the captured electronic images of the pieces of mail addressed to the physical mailbox.

6. The system of claim 5, wherein the information derived from the captured electronic images includes a portion of the image captured corresponding to the physical pieces of mail delivered to the physical mailbox, and wherein the notification component is further configured with instructions to:
   store a proof of residency associated with the physical mailbox; and
   before sending the electronic delivery notification to the electronic account, confirm an appropriate delivery of mail by comparing the proof of residency with the information derived from the captured electronic images of the pieces of mail addressed to the physical mailbox.

7. The system of claim 1, wherein the notification component is further configured to activate a visible, symbol-based alert by the device worn by the second postal worker.

8. The system of claim 1, wherein the set of geo-location data includes a second mail-delivery boundary associated with the physical mailbox, the second mail-delivery boundary received from a user selection provided by a postal worker, and wherein the notification component is further configured with instructions to compare the current location of the GPS-enabled device with the second mail-delivery boundary, and wherein generating the electronic delivery notification is also based on the comparison of the currently location of the GPS-enabled device with the second mail-delivery boundary.

* * * * *

(12) EX PARTE REEXAMINATION CERTIFICATE (11501st)
United States Patent
Pleasant

(10) Number: US 9,609,973 C1
(45) Certificate Issued: Apr. 17, 2019

(54) AUTOMATED POSTAL DELIVERY NOTIFICATION BASED ON GEOLOCATION

(71) Applicant: Anthem Andrew Pleasant, Peoria, AZ (US)

(72) Inventor: Anthem Andrew Pleasant, Peoria, AZ (US)

Reexamination Request:
No. 90/014,141, May 18, 2018

Reexamination Certificate for:
Patent No.: 9,609,973
Issued: Apr. 4, 2017
Appl. No.: 14/971,881
Filed: Dec. 16, 2015

Related U.S. Application Data

(60) Provisional application No. 62/166,008, filed on May 24, 2015.

(51) Int. Cl.
| | | |
|---|---|---|
| G08B 13/14 | (2006.01) | |
| A47G 29/122 | (2006.01) | |
| G06F 17/30 | (2006.01) | |
| H04L 12/58 | (2006.01) | |
| G06F 16/29 | (2019.01) | |
| A47G 29/12 | (2006.01) | |
| G06F 16/9537 | (2019.01) | |

(52) U.S. Cl.
CPC ......... *G06F 16/29* (2019.01); *A47G 29/1214* (2013.01); *G06F 16/9537* (2019.01); *H04L 51/18* (2013.01); *H04L 51/20* (2013.01); *H04L 51/24* (2013.01)

(58) Field of Classification Search
None
See application file for complete search history.

(56) References Cited

To view the complete listing of prior art documents cited during the proceeding for Reexamination Control Number 90/014,141, please refer to the USPTO's public Patent Application Information Retrieval (PAIR) system under the Display References tab.

*Primary Examiner* — Angela M Lie

(57) ABSTRACT

Disclosed herein is a system for providing electronic notifications of physical delivery of mail. Realtime geolocation services are leveraged to trigger one or more automated notifications. The notifications are delivered via a modern delivery means such as email, SMS text or pre-recorded voice message. No extra equipment is needed to implement the system from the perspective of postal workers since many postal workers already carry a GPS-enabled device. Instead of people passively waiting around for an imprecise time of delivery, people can go about their lives and can respond to actual delivery of paper-based mail via a notification and notification type of their choosing.

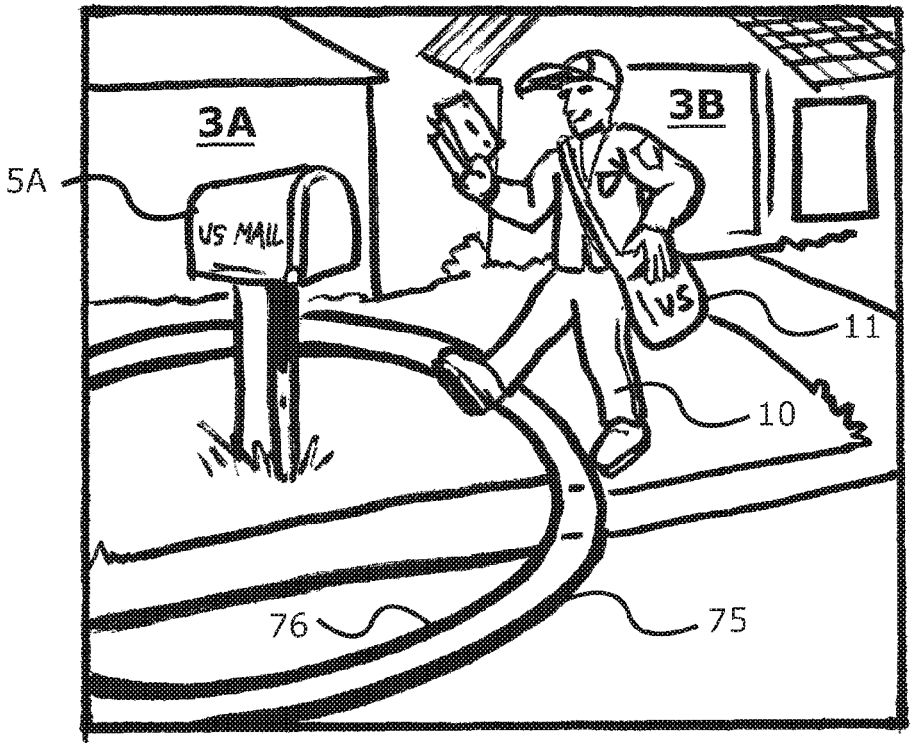

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-5, 7 and 8 are cancelled.

Claim 6 is determined to be patentable as amended.

New claims 9 and 10 are added and determined to be patentable.

6. [The system of claim 5, wherein the information derived from the captured electronic images includes] *An electronic notification system for mail delivery, the system comprising:*
   *a set of geo-location data associated with a physical mailbox, stored in a first database operative on a first computing device, the set of geo-location data including:*
      *a first mail-delivery boundary associated with the physical mailbox, the first mail-delivery boundary received from a user selection provided by an owner of the physical mailbox; and*
      *a threshold dwell time associated with the physical mailbox;*
   *an electronic account credential associated with the physical mailbox, stored in the first database, the electronic account credential including an electronic address of an electronic messaging service;*
   *a GPS-enabled device for carrying by a postal worker delivering a piece of mail to the physical mailbox, and wherein the GPS-enabled device is configured with instructions to communicate its current location to the system;*
   *a notification component, operating in a memory of the first computing device, in electronic communication with the GPS-enabled device, the notification component configured with instructions to:*
      *store a proof of residency associated with the physical mailbox;*
      *confirm an appropriate delivery of mail by comparing the proof of residency with information derived from a captured electronic image of the piece of mail addressed to the physical mailbox;*
      *detect a first transition across the first mail-delivery boundary by comparing the current location of the GPS-enabled device with the first mail-delivery boundary;*
      *determine an actual dwell time of the GPS-enabled device remaining geographically proximate to the first mail-delivery boundary;*
      *compare the actual dwell time to the threshold dwell time;*
      *generate an electronic delivery notification; and*
      *after confirming the appropriate delivery of mail by comparing the proof of residency with the information derived from the captured electronic image of the piece of mail addressed to the physical mailbox, send the electronic delivery notification to the electronic account based on the detected first transition and dwell time comparison;*
   *an image capturing component that is configured with instructions to:*
      *capture the electronic image of the piece of mail addressed to the physical mailbox;*
      *perform optical character recognition (OCR) on the captured electronic image, via an electronic device having a camera, a processor, and a memory configured with computer-executable instructions to perform the OCR; and*
   *wherein the notification component is further configured with instructions to match delivery information derived from the OCR with a delivery address of the physical mailbox, and wherein generating the electronic delivery notification includes adding, to the electronic delivery notification, (1) information derived from the captured electronic image of the piece of mail addressed to the physical mailbox, and (2) a portion of the image captured corresponding to the* [physical pieces] *piece of mail delivered to the physical mailbox*[, and
   wherein the notification component is further configured with instructions to:
      store a proof of residency associated with the physical mailbox; and
      before sending the electronic delivery notification to the electronic account, confirm an appropriate delivery of mail by comparing the proof of residency with the information derived from the captured electronic images of the pieces of mail addressed to the physical mailbox].

9. *A method for mail delivery, the method comprising:*
   *capturing, by an image capturing component, an electronic image of a piece of mail addressed to a physical mailbox;*
   *performing optical character recognition (OCR) on the captured electronic image, via an electronic device having a camera, a processor, and a memory configured with computer-executable instructions to perform the OCR;*
   *matching delivery information derived from the performed OCR with a delivery address of the physical mailbox;*
   *storing a set of geo-location data associated with the physical mailbox in a first database operative on a first computing device, the set of geo-location data including:*
      *a first mail-delivery boundary associated with the physical mailbox, the first mail-delivery boundary received from a user selection provided by an owner of the physical mailbox; and*
      *a threshold dwell time associated with the physical mailbox;*
   *storing an electronic account credential associated with the physical mailbox in the first database, the electronic account credential including an electronic address of an electronic messaging service;*
   *communicating a current location of a GPS-enabled device carried by a postal worker delivering the piece of mail to the physical mailbox; and*
   *operating, in a memory of the first computing device, a notification component, the first computing device in electronic communication with the GPS-enabled device, the notification component configured to:*
      *store a proof of residency associated with the physical mailbox;* confirm an appropriate delivery of mail by comparing the proof of residency with information derived from the captured electronic image of the piece of mail addressed to the physical mailbox;

detect a first transition across the first mail-delivery boundary by comparing the current location of the GPS-enabled device with the first mail-delivery boundary;

determine an actual dwell time of the GPS-enabled device remaining geographically proximate to the first mail-delivery boundary;

compare the actual dwell time to the threshold dwell time;

generate an electronic delivery notification, the electronic delivery notification including: (1) information derived from the captured electronic image of the piece of mail addressed to the physical mailbox and (2) a portion of the image captured corresponding to the piece of mail delivered to the physical mailbox; and after confirming the appropriate delivery of mail, send the electronic delivery notification to the electronic account based on the detected first transition and dwell time comparison.

10. A device for mail delivery notification, the device comprising:

an image capturing component configured to:
  capture, via a camera, an electronic image of a piece of mail addressed to a physical mailbox;
  perform optical character recognition (OCR) on the captured electronic image, via a processor and a memory configured with computer-executable instructions to perform the OCR; and
  match delivery information derived from the performed OCR with a delivery address of the physical mailbox;

a first database operative configured to store:
  a set of geo-location data associated with the physical mailbox, the set of geo-location data including a first mail-delivery boundary associated with the physical mailbox, the first mail-delivery boundary received from a user selection provided by an owner of the physical mailbox;
  a threshold dwell time associated with the physical mailbox;
  an electronic account credential associated with the physical mailbox, the electronic account credential including an electronic address of an electronic messaging service; and
  a proof of residency associated with the physical mailbox;

a notification component in electronic communication with a GPS-enabled device, the notification component configured to:
  receive a current location of a GPS-enabled device carried by a postal worker delivering the piece of mail to the physical mailbox;
  confirm an appropriate delivery of mail by comparing the proof of residency with information derived from the captured electronic image of the piece of mail addressed to the physical mailbox;
  detect a first transition across the first mail-delivery boundary by comparing the current location of the GPS-enabled device with the first mail-delivery boundary;
  determine an actual dwell time of the GPS-enabled device remaining geographically proximate to the first mail-delivery boundary;
  compare the actual dwell time to the threshold dwell time;
  generate an electronic delivery notification, the electronic delivery notification including: (1) information derived from the captured electronic image of the piece of mail addressed to the physical mailbox and (2) a portion of the image captured corresponding to the piece of mail delivered to the physical mailbox; and
  after confirming the appropriate delivery of mail, send the electronic delivery notification to the electronic account based on the detected first transition and dwell time comparison.

* * * * *